United States Patent
Kim et al.

(10) Patent No.: US 9,785,465 B2
(45) Date of Patent: Oct. 10, 2017

(54) METHOD FOR TASK GROUP MIGRATION AND ELECTRONIC DEVICE SUPPORTING THE SAME

(71) Applicant: Samsung Electronics Co., Ltd, Gyeonggi-do (KR)

(72) Inventors: Joohwan Kim, Gyeonggi-do (KR); Dohyoung Kim, Gyeonggi-do (KR); Hyunjin Park, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/722,464

(22) Filed: May 27, 2015

(65) Prior Publication Data
US 2015/0347184 A1    Dec. 3, 2015

(30) Foreign Application Priority Data
May 27, 2014    (KR) .................. 10-2014-0063722

(51) Int. Cl.
G06F 9/46    (2006.01)
G06F 9/48    (2006.01)
G06F 9/50    (2006.01)

(52) U.S. Cl.
CPC .......... G06F 9/4856 (2013.01); G06F 9/5088 (2013.01); *Y02B 60/162* (2013.01)

(58) Field of Classification Search
CPC .................................................. G06F 9/4856
USPC ...................................................... 718/1–108
See application file for complete search history.

(56) References Cited

U.S. PATENT DOCUMENTS

| 3,327,101 A * | 6/1967 | Evans .................. G05B 19/351 318/569 |
| 8,065,676 B1 * | 11/2011 | Sahai .................... G06F 9/5077 709/226 |
| 8,245,235 B1 | 8/2012 | Belady et al. |
| 2004/0249650 A1 * | 12/2004 | Freedman .............. G06Q 30/02 705/7.29 |
| 2008/0263324 A1 * | 10/2008 | Sutardja ................ G06F 1/3203 712/43 |
| 2009/0210875 A1 * | 8/2009 | Bolles .................. G06F 3/0608 718/1 |

(Continued)

FOREIGN PATENT DOCUMENTS

EP    2214100    8/2010
KR    20130121412 A    11/2013

OTHER PUBLICATIONS

Iskra, K. A., et al. "The implementation of Dynamite: An environment for migrating PVM tasks." ACM SIGOPS Operating Systems Review 34.3 (2000): pp. 40-55.*

(Continued)

*Primary Examiner* — Satish Rampuria

(57) ABSTRACT

Provided is a method for task migration in an electronic device. The method includes: assigning a task with a specific function to a first group among groups formed according to a preset criterion; assigning the first group to one of first processing units functionally connected to the electronic device; and migrating, when the first group matches preset criteria of second processing units functionally connected to the electronic device, the first group to one of the second processing units. Based on this, it is possible to create various other embodiments.

20 Claims, 9 Drawing Sheets

(56) References Cited

U.S. PATENT DOCUMENTS

| | | | |
|---|---|---|---|
| 2010/0125845 A1* | 5/2010 | Sugumar | G06F 9/5088 718/1 |
| 2010/0153966 A1 | 6/2010 | Arimilli et al. | |
| 2011/0047555 A1* | 2/2011 | Lakshmanan | G06F 9/5088 718/105 |
| 2012/0017219 A1* | 1/2012 | Hsieh | G06F 9/5088 718/104 |
| 2012/0180061 A1* | 7/2012 | Rao | G06F 9/5088 718/104 |
| 2012/0291040 A1* | 11/2012 | Breternitz | G06F 9/5083 718/104 |
| 2013/0318374 A1 | 11/2013 | Hum et al. | |
| 2014/0136729 A1 | 5/2014 | Chan et al. | |

OTHER PUBLICATIONS

Nerur, Sridhar, RadhaKanta Mahapatra, and George Mangalaraj. "Challenges of migrating to agile methodologies." Communications of the ACM 48.5 (2005): pp. 72-78.*

Merkel, Andreas, and Frank Bellosa. "Balancing power consumption in multiprocessor systems." ACM SIGOPS Operating Systems Review. vol. 40. No. 4. ACM, 2006. pp. 403-414.*

European Search Report issued for EP 15169356.1 dated Nov. 4, 2015, 8 pgs.

* cited by examiner

METHOD FOR TASK GROUP MIGRATION AND ELECTRONIC DEVICE SUPPORTING THE SAME

CROSS-REFERENCE TO RELATED APPLICATION AND CLAIM OF PRIORITY

The present application is related to and claims the benefit under 35 U.S.C. §119(a) of a Korean patent application filed on May 27, 2014, in the Korean Intellectual Property Office and assigned Serial No. 10-2014-0063722, the entire disclosure of which is hereby incorporated by reference.

TECHNICAL FIELD

The present disclosure relates to a method for task group migration and electronic device supporting the same.

BACKGROUND

With recent advances in the processor technology, single-core processors have evolved into multi-core processors. A multi-core processor may increase execution performance of an application by running multiple tasks at the same time through parallelization.

SUMMARY

In a typical multi-core processor, one processing unit is assigned to a task according to a specific policy. When the load of the task becomes greater than a preset threshold, the task may be migrated to a high-performance processing unit. However, such a change in processing unit assignment based on task load may lower the efficiency currently consumed in the multi-core processor.

To address the above-discussed deficiencies, it is a primary object of the present disclosure to provide a method for task group migration and electronic device supporting the same that may solve the above problem.

Certain embodiments of the present disclosure include a method for task migration in an electronic device. The method may include: assigning a task with a specific function to a first group among groups formed according to a preset criterion; assigning the first group to one of first processing units functionally connected to the electronic device; and migrating, when the first group matches preset criteria of second processing units functionally connected to the electronic device, the first group to one of the second processing units.

Certain embodiments of the present disclosure include an electronic device. The electronic device may include: first processing units functionally connected to the electronic device; second processing units functionally connected to the electronic device; a group determiner to assign a task with a specific function to a first group among groups formed according to a preset criterion; and a processing unit controller to control a process of assigning the first group to one of the first processing units, and migrate the first group to one of the second processing units when the first group matches preset criteria of the second processing units.

In a feature of the present disclosure, the method for task group migration enables the electronic device to classify tasks into groups according to a preset criterion and assign processing units to task groups according to performance or power requirements of the task groups. Hence, it is possible to increase system performance while reducing unnecessary power consumption in the electronic device Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
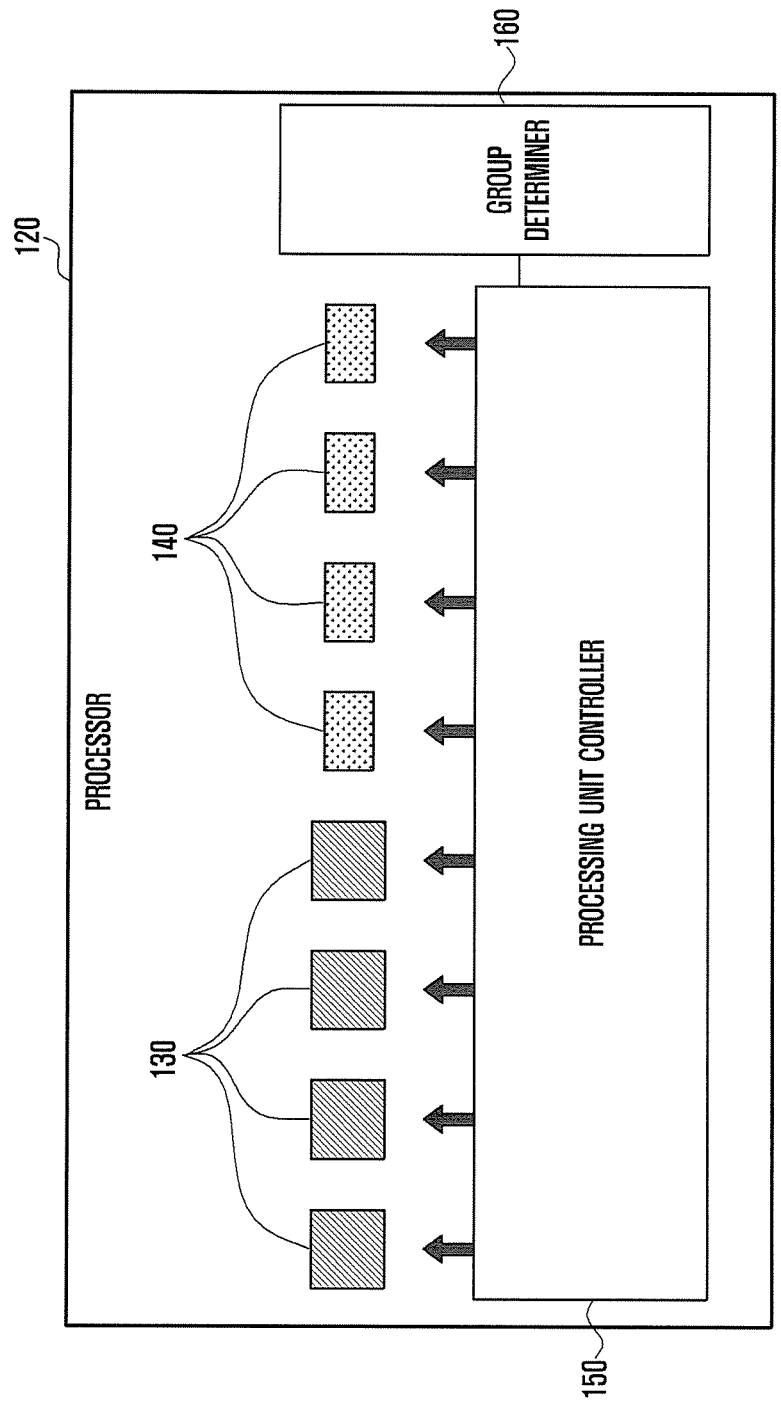
FIG. 1 illustrates a configuration of processing units according to various embodiments of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication device. Hereinafter, embodiments of the present disclosure are described in detail with reference to the accompanying drawings. While the present disclosure may be embodied in many different forms, specific embodiments of the present disclosure are shown in drawings and are described herein in detail, with the understanding that the present disclosure is to be considered as providing examples of the principles of the disclosure and is not intended to limit the disclosure to the specific embodiments illustrated. The same reference numbers are used throughout the drawings to refer to the same or like parts.

An expression "comprising" or "may comprise" used in the present disclosure indicates presence of a corresponding function, operation, or element and does not limit additional at least one function, operation, or element. Further, in the present disclosure, a term "comprise" or "have" indicates presence of a characteristic, numeral, step, operation, element, component, or combination thereof described in a specification and does not exclude presence or addition of at least one other characteristic, numeral, step, operation, element, component, or combination thereof.

In the present disclosure, an expression "or" includes any combination or the entire combination of together listed words. For example, "A or B" may include A, B, or A and B.

An expression of a first and a second in the present disclosure may represent various elements of the present disclosure, but do not limit corresponding elements. For example, the expression does not limit order and/or importance of corresponding elements. The expression may be used for distinguishing one element from another element. For example, both a first user device and a second user device are user devices and represent different user devices. For example, a first constituent element may be referred to as a second constituent element without deviating from the scope of the present disclosure, and similarly, a second constituent element may be referred to as a first constituent element.

When it is described that an element is "coupled" to another element, the element may be "directly coupled" to the other element or "electrically coupled" to the other element through a third element. However, when it is described that an element is "directly coupled" to another element, no element exists between the element and the other element.

Terms used in the present disclosure are not to limit the present disclosure but to illustrate embodiments. When using in a description of the present disclosure and the appended claims, a singular form includes a plurality of forms unless it is explicitly differently represented.

Unless differently defined, entire terms including a technical term and a scientific term used here have the same meaning as a meaning that may be generally understood by a person of common skill in the art. It should be analyzed that generally using terms defined in a dictionary have a meaning corresponding to that of a context of related technology and are not analyzed as an ideal or excessively formal meaning unless explicitly defined.

In this disclosure, an electronic device may be a device that involves a communication function. For example, an electronic device may be a smart phone, a tablet PC (Personal Computer), a mobile phone, a video phone, an e-book reader, a desktop PC, a laptop PC, a netbook computer, a PDA (Personal Digital Assistant), a PMP (Portable Multimedia Player), an MP3 player, a portable medical device, a digital camera, or a wearable device (e.g., an HMD (Head-Mounted Device) such as electronic glasses, electronic clothes, an electronic bracelet, an electronic necklace, an electronic appcessory, or a smart watch).

According to some embodiments, an electronic device may be a smart home appliance that involves a communication function. For example, an electronic device may be a TV, a DVD (Digital Video Disk) player, audio equipment, a refrigerator, an air conditioner, a vacuum cleaner, an oven, a microwave, a washing machine, an air cleaner, a set-top box, a TV box (e.g., Samsung HomeSync™, Apple TV™, Google TV™, etc.), a game console, an electronic dictionary, an electronic key, a camcorder, or an electronic picture frame.

According to some embodiments, an electronic device may be a medical device (e.g., MRA (Magnetic Resonance Angiography), MRI (Magnetic Resonance Imaging), CT (Computed Tomography), ultrasonography, etc.), a navigation device, a GPS (Global Positioning System) receiver, an EDR (Event Data Recorder), an FUR (Flight Data Recorder), a car infotainment device, electronic equipment for ship (e.g., amarine navigation system, a gyrocompass, etc.), avionics, security equipment, or an industrial or home robot.

According to some embodiments, an electronic device may be furniture or part of a building or construction having a communication function, an electronic board, an electronic signature receiving device, a projector, or various measuring instruments (e.g., a water meter, an electric meter, a gas meter, a wave meter, etc.). An electronic device disclosed herein may be one of the above-mentioned devices or any combination thereof. As well understood by those skilled in the art, the above-mentioned electronic devices are examples only and not to be considered as a limitation of this disclosure.

Hereinafter, an electronic device according to various embodiments will be described with reference to the accompanying drawings. The term 'user' to be used herein may refer to a person or machine (e.g., an artificial intelligence apparatus or system) using an electronic device.

In various embodiments, the electronic device 800, 804 or 900 may include a heterogeneous multi-core processor having at least two cores of different types. The multi-core processor may be composed of different processing units such as X86, X64, ARM, GPU and DSP.

In various embodiments, a "processor" includes at least one core, and may be defined as an independent entity capable of interacting with other components of the device.

In various embodiments, a "processing unit" may be defined as a minimum entity that can interpret and execute instructions in a processor, and may be used interchangeably with a "core".

Figure 8:
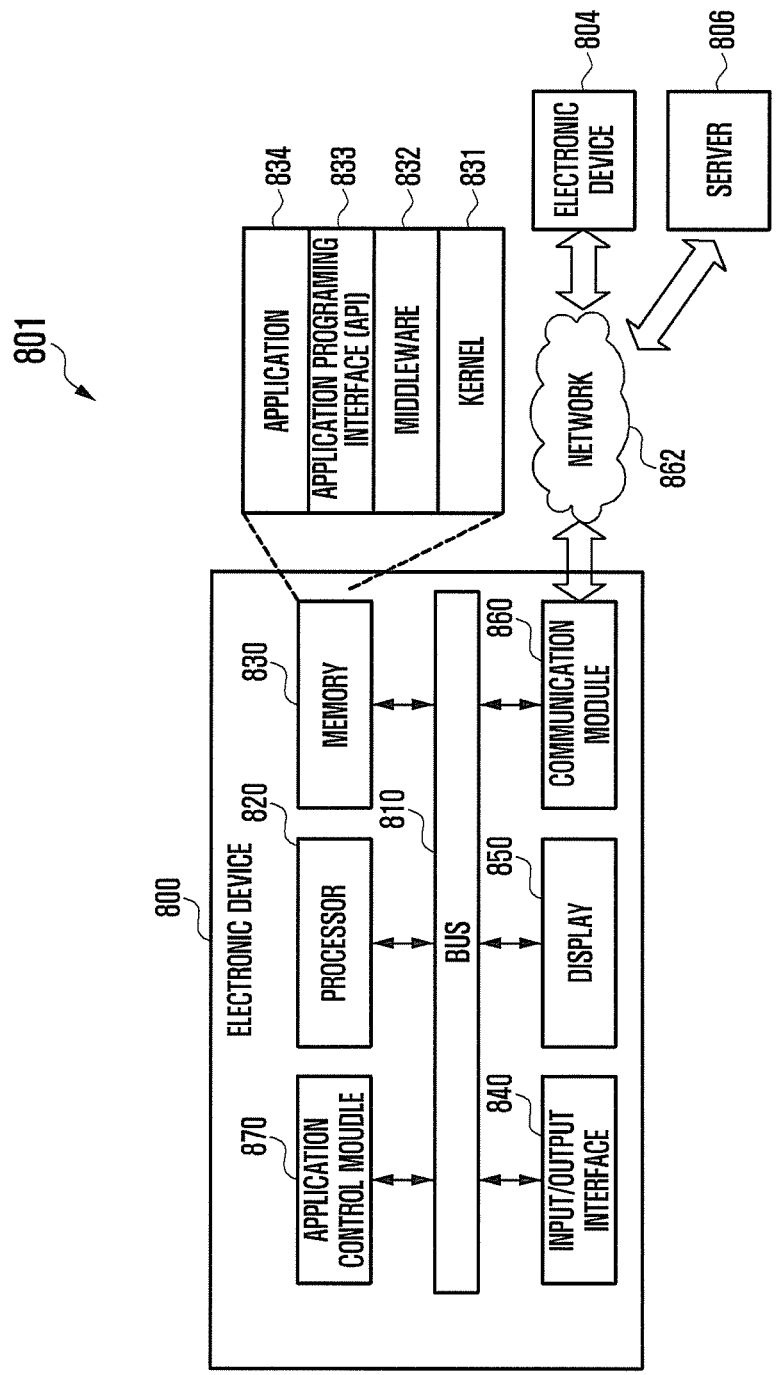
FIG. 8 illustrates a network environment including an electronic device in accordance with embodiments of the present disclosure.
Figure 9:
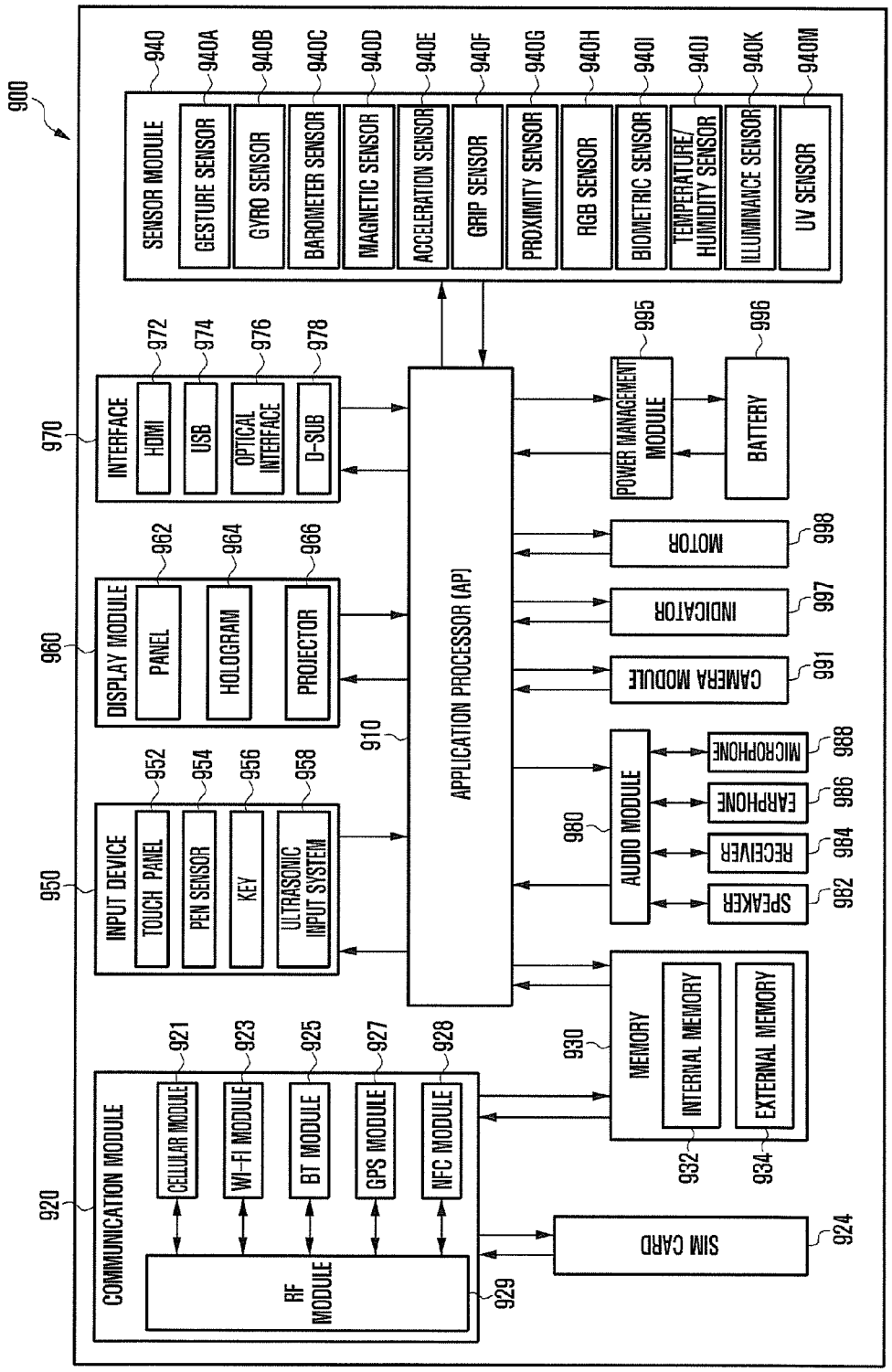
FIG. 9 illustrates an electronic device in accordance with embodiments of the present disclosure.

Next, a multiprocessor system and an electronic device 800, 804 or 900 having a multiprocessor system are described as various embodiments with reference to the drawings, such as in FIGS. 8 and 9.

FIG. 1 illustrates a configuration of processing units 130 and 140 according to various embodiments of the present disclosure.

Referring to FIG. 1, a processor 120 may include first processing units 130, second processing units 140, a processing unit controller 150, and a group determiner 160.

The processor 120 may include one or more processing units. In various embodiments, the processing units may be represented as the first processing units 130 and second processing units 140. That is, a first processing unit 130 and a second processing unit 140 may be a minimum entity that can execute instructions of a task.

The first processing units 130 and the second processing units 140 may be processing units categorized according to processing performance or processing power. The first processing units 130 or the second processing units 140 may be a dual-core unit, triple-core unit, quad-core unit, hexa-core unit, or octa-core unit. The first processing units 130 and the second processing units 140 may be high-performance big cores (e.g., Cortex-A15 cores) or low-power little cores (e.g., Cortex-A7 cores). In FIG. 1, although eight processing units are shown (octa-core) for illustration, the present disclosure is not limited thereto.

Here, a task refers to an executable job with a separate program section (e.g., code, variable, stack or the like). A task may correspond to a user request. In an embedded system, a task may be a minimum entity for scheduling. Scheduling may involve assigning priorities to tasks to be processed.

In one embodiment, a task having a specific function may be assigned to a first group among multiple groups formed according to a preset or dynamically adjustable criterion. For example, when multiple tasks having specific functions are present, those tasks with identical or similar functions may be classified into the same group.

In various embodiments, the first group may be a group of tasks related with the operating system of the electronic device 800, 804 or 900. The first group may also be a group of tasks related with applications of the electronic device 800, 804 or 900. For example, the first group may be a group of tasks related with foreground applications whose functions are active or user interfaces are in display. The first group may be a group of tasks related with background applications whose functions are in a wait state or user interfaces are not in display.

An application may be related with a function executed by the electronic device 800, 804 or 900. For example, an application may be a piece of software running on the operating system. A word processor program and spreadsheet program may be a typical example of an application.

In certain embodiments, applications may be classified into foreground applications and background applications. A foreground application is an application whose function is activated and whose user interface is on display. A background application is an application whose function is in a wait state or activated and whose user interface is not on display.

For example, when the user selects an icon linked with an audio application to play audio data first and then selects an icon linked with a message application, the audio application may continue to output sounds while the user composes a message. Here, the message application being currently active may be a foreground application. The audio application may be a background application because user interface of the audio application is not displayed although the audio application is currently active.

A background application selected by the user may be switched to a deactivated state after another application is activated. For example, when a memo application is activated first and then another application is activated, the memo application may be switched to a wait state. Here, the memo application may become a background application.

In certain embodiments, the processing unit controller 150 may assign the first group of tasks to the first processing units 130. Here, one or more of the first processing units 130 may be actually utilized to process the first group.

Thereafter, when the first group is determined as matching preset criteria of the second processing units 140, the processing unit controller 150 may cause the first group to be migrated to the second processing units 140.

Here, migration may indicate transfer from one operating system to another operating system. For example, the main agent for task execution (e.g., computation, control or the other) may be switched from the first processing units 130 to the second processing units 140.

The criteria of the second processing units 140 may be related with the amount of data needed by a group of tasks, activation of an application in the group, and threshold throughput for the group. For example, when the amount of data of the first group is greater than a preset threshold amount, the first group may match the criteria of the second processing units 140.

In various embodiments, it may be assumed that the first processing units 130 are high-performance or high-power cores and the second processing units 140 are low-performance or low-power cores. In this case, when the first group of tasks assigned to the first processing units 130 is associated with background applications of the electronic device 800, 804 or 900, the processing unit controller 150 may migrate the first group to the second processing units 140. As background applications need less power than foreground applications, the processing unit controller 150 may migrate the first group associated with background applications to the second processing units 140 (e.g., A7 cores).

In certain embodiments, the processing unit controller 150 may check whether the load of a task assigned to first processing unit 130 is less than or equal to a preset load value. If the load of the task is less than or equal to the preset load value, the processing unit controller 150 may migrate the task to a second processing unit 140.

For example, the processor 120 may measure WI-FI throughput related to transmission and reception. The processor 120 may check whether the measured WI-FI throughput is less than or equal to a preset threshold throughput. Here, the comparison may be conducted in consideration of a margin of error (e.g., 5% or 10%). If the measured WI-FI throughput is less than or equal to the threshold throughput, the processor 120 may migrate active tasks as a group to a high-performance processing unit (e.g., A15 core).

In certain embodiments, the processing unit controller 150 may check presence of a task not assigned to a first processing unit 130 or a second processing unit 140. If a task not assigned yet is present, the processing unit controller 150 may compare the performance or power of the first processing unit 130 with that of the second processing unit 140.

On the basis of the result of comparison, the processing unit controller 150 may select one of the first processing unit 130 and the second processing unit 140 with lower performance or lower power. Then, the processing unit controller 150 may assign the task not yet assigned to the selected processing unit.

The group determiner 160 may classify multiple tasks into preset groups according to preset criteria or dynamically configurable criteria. Here, tasks with identical or similar functions may be classified into the same group. For example, tasks associated with operation of the electronic device 800, 804 or 900 may be classified into one group, and tasks associated with external communication of the electronic device 800, 804 or 900 may be classified into another group. The dynamically configurable criteria may be changed during operation.

The group determiner 160 may assign tasks to the groups. For example, tasks associated with operation of the electronic device 800, 804 or 900 may be assigned to one group, and tasks associated with external communication of the electronic device 800, 804 or 900 may be assigned to another group. More specifically, a task having a messaging function and a task having a communication function may be assigned to the first group of tasks related with background applications.

In certain embodiments, when a first application is deactivated owing to user selection of a second application, the group determiner 160 may assign the task associated with the deactivated first application to the first group.

Figure 2:
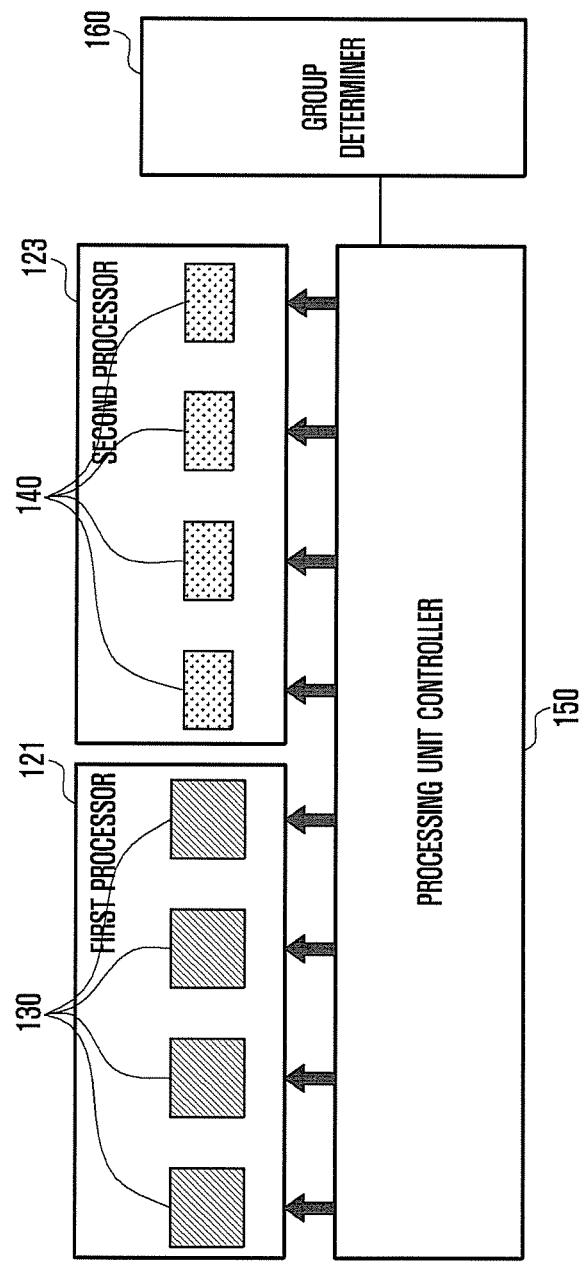
FIG. 2 illustrates a configuration of processing units according to various embodiments of the present disclosure.

FIG. 2 illustrates a configuration of processing units 130 and 140 according to various embodiments. Referring to FIG. 2, the electronic device may include first processor 121 including first processing units 130, a second processor 123 including second processing units 140, a processing unit controller 150, and a group determiner 160.

In various embodiments, a first processing unit 130 of the first processor 121 and a second processing unit 140 of the second processor 123 may be a minimum entity that can execute instructions of a task.

The processing unit controller 150 may assign the first group to the first processing units 130. Here, one or more of the first processing units 130 may be actually utilized to process the first group of tasks. Thereafter, when the first group is determined as matching preset criteria of the second processing units 140, the processing unit controller 150 may cause the first group to be migrated to the second processing units 140.

The group determiner 160 may classify multiple tasks into preset groups according to preset criteria or dynamically configurable criteria. Here, tasks with identical or similar functions may be classified into the same group. For example, tasks associated with operation of the electronic device 800, 804 or 900 may be classified into one group, and tasks associated with external communication of the electronic device 800, 804 or 900 may be classified into another group.

Figure 3:
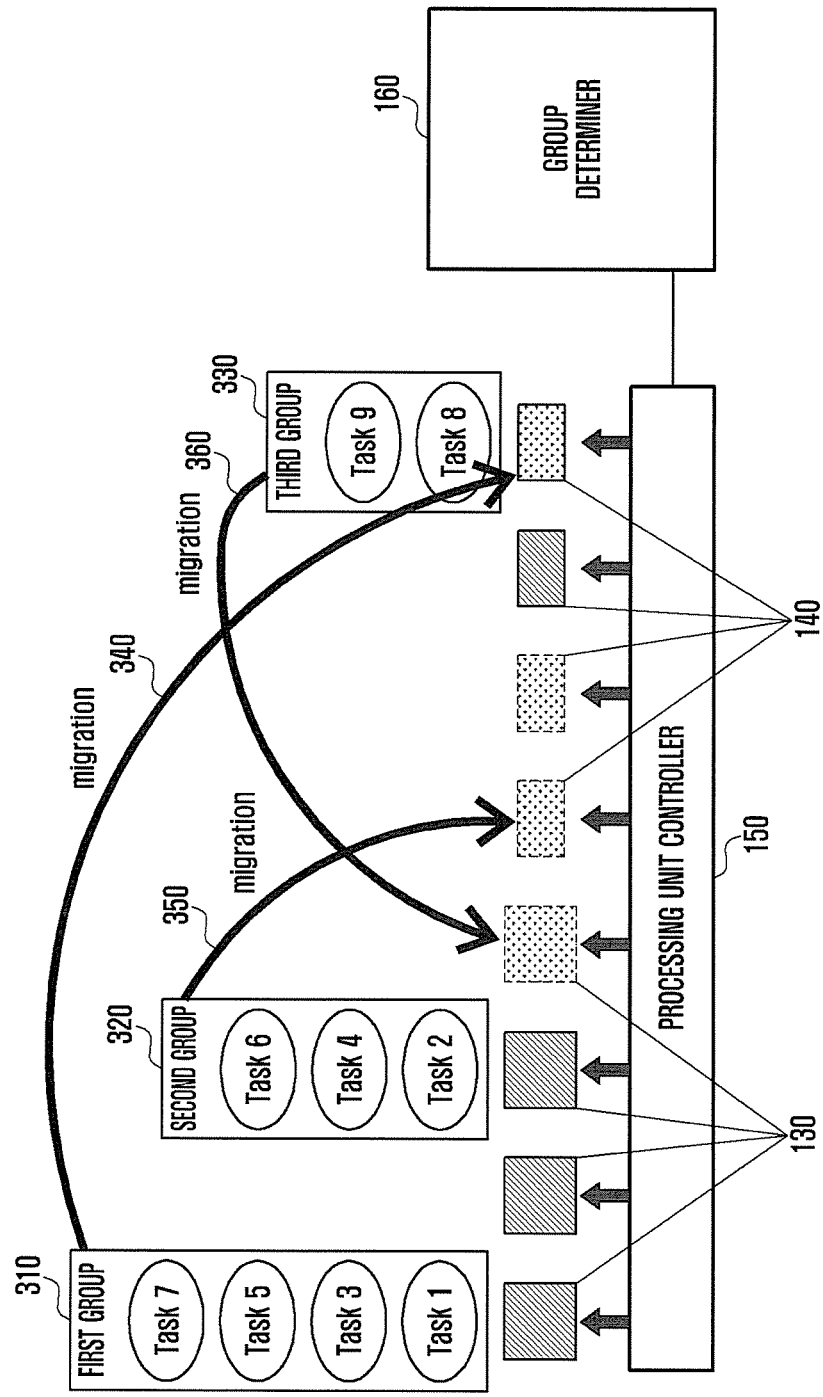
FIGS. 3 and 4 illustrate task group migration between processing units according to various embodiments of the present disclosure.
Figure 4:
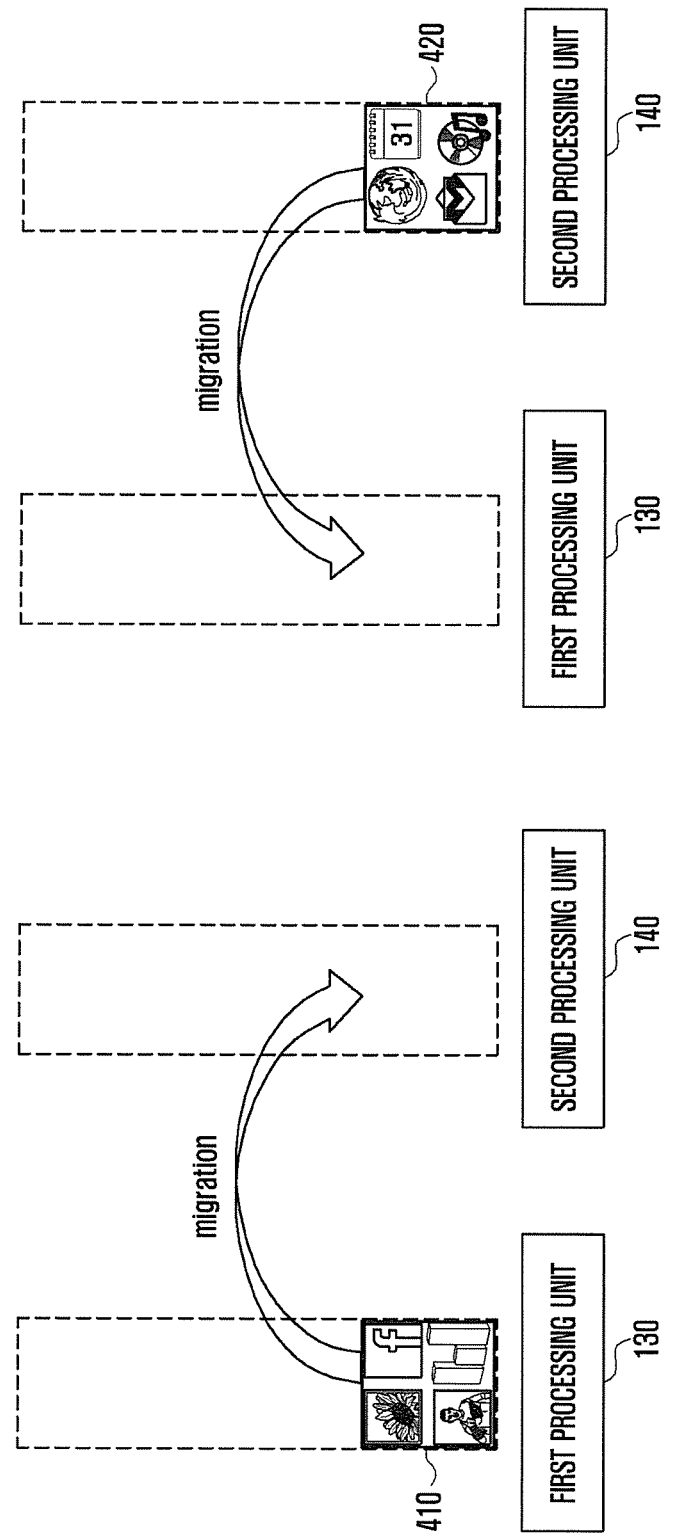

FIGS. 3 and 4 depict task group migration between processing units 130 and 140 according to various embodiments.

Referring to FIG. 3, the first processing units 130 may process and control the first group 310 and the second group 320. Here, the first group 310 may be composed of Task 1, Task 3, Task 5 and Task 7. The second group 320 may be composed of Task 2, Task 4 and Task 6. The second processing units 140 may process and control a third group 330. The third group 330 may be composed of Task 8 and Task 9.

When the first group 310 or second group 320 is determined as being suitable for the second processing units 140, the processing unit controller 150 may migrate 340 the first group 310 to the second processing units 140 or migrate 350 the second group 320 to the second processing units 140.

For example, when the first processing units 130 are high-performance cores such as A15 cores and the load of the first group 310 and the second group 320 is low, the processing unit controller 150 may migrate the first group 310 and the second group 320 to the low-power processing units such as A7 cores. Here, the processing unit controller 150 may utilize throughput as a measure of load and compare the current load with a preset threshold throughput. The threshold throughput may be set in terms of the amount of data specified by the manufacturer or the user, or the ratio of the amount of data consumed by one group to the total amount of data.

When the load of the third group 330 (or the amount of power consumed) is too high for the second processing units 140 of low power, the processing unit controller 150 may migrate 360 the third group 330 to the first processing units 130. For example, when Task 8 and Task 9 of the third group 330 are related with a 3D game application, the second processing units 140 may have difficulty in smoothly executing Task 8 and Task 9. On the basis of the amount of power consumed by the third group 330 or other criteria (e.g., user settings, manufacturer settings, the amount of throughput, and the amount of battery power consumed), the processing unit controller 150 may migrate 360 the third group 330 to the first processing units 130 of high performance.

The group determiner 160 may monitor the load of a task assigned to and processed by a first processing unit 130 or second processing unit 140 and check whether the load exceeds a threshold value. For tasks assigned to the first processing units 130, the group determiner 160 may identify a task whose load is less than or equal to a threshold value. For tasks assigned to the second processing units 140, the group determiner 160 may identify a task whose load is greater than a threshold value. Here, the threshold values for task load may be defined on the basis of user settings, manufacturer settings, the amount of throughput, and the amount of battery power consumed. Dynamically configurable criteria may be changed during operation.

Referring to FIG. 4, the processing unit controller 150 may migrate a high-performance group 410 and a low-performance group 420 between processing units. For example, the high-performance group 410 may be composed of tasks associated with games or Social Networking Services (SNS). The low-performance group 420 may be composed of tasks associated with a calendar or memo.

Here, the first processing unit 130 may be a low-performance or low-power core, and the second processing unit 140 may be a high-performance or high-power core. When the high-performance group 410 is assigned to the first processing unit 130, the processing unit controller 150 may migrate the high-performance group 410 to the second processing unit 140. When the low-performance group 420 is assigned to the second processing unit 140, the processing unit controller 150 may migrate the low-performance group 420 to the first processing unit 130.

Figure 5:
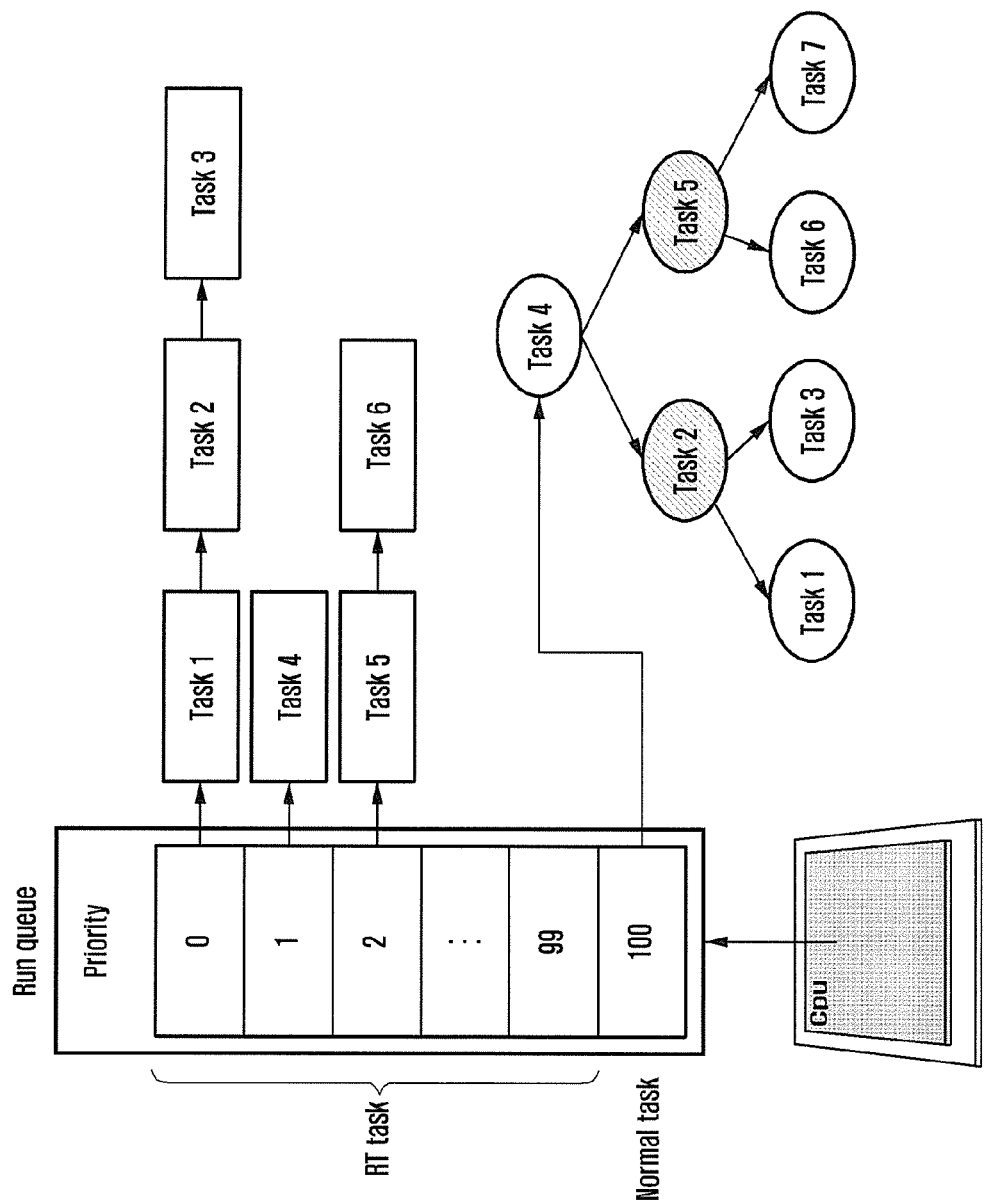
FIG. 5 illustrates assignment of processing units according to various embodiments of the present disclosure.

FIG. 5 illustrates assignment of processing units 130 and 140 according to various embodiments.

The processing unit controller 150 may check the presence of a task not assigned to a first processing unit 130 or a second processing unit 140. If a task not assigned yet is present, the processing unit controller 150 may compare the first processing unit 130 and the second processing unit 140 in terms of performance or power.

On the basis of the result of comparison, the processing unit controller 150 gray select one of the first processing unit 130 and the second processing unit 140 with lower performance or lower power. Then, the processing unit controller 150 may assign the task not yet assigned to the selected processing unit.

For example, a run queue for task execution may be attached to a processing unit such as a core. Real-time (RT) tasks with fixed priorities and normal tasks may be inserted in the run queue. An RT task with a fixed priority may be in an unassigned state or be assigned to a processing unit. Here, the processing unit controller 150 may assign or migrate a RT task with a fixed priority to a processing unit of low performance or low power.

The load to process RT tasks may be not too high. The group determiner 160 may classify low-load tasks into a group. The processing unit controller 150 may assign a group of RT tasks (e.g., first group or second group) to a processing unit of low performance or low power. When a group of RT tasks is already assigned, the processing unit controller 150 may migrate the group of RT tasks to a processing unit of low performance or low power.

Figure 6:
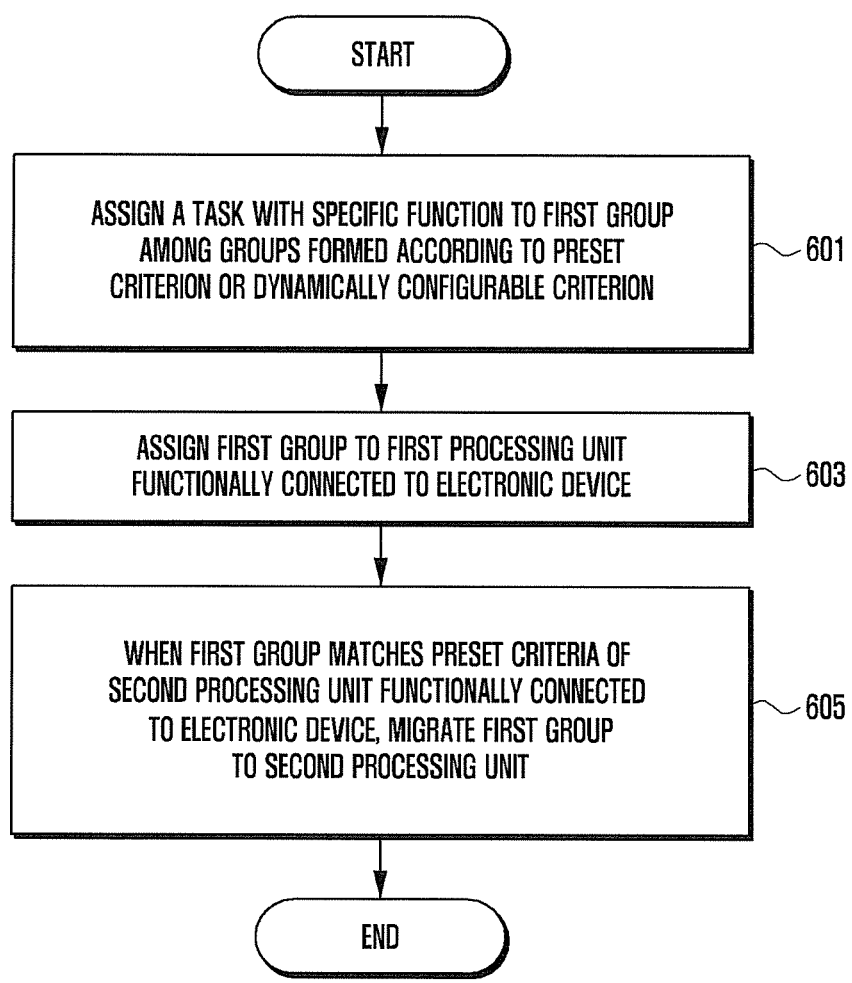
FIG. 6 illustrates a method for task group migration between processing units according to various embodiments of the present disclosure.

FIG. 6 illustrates a method for task group migration between processing units according to various embodiments of the present disclosure.

Referring to FIG. 6, at block 601, the group determiner 160 assigns a task with a specific function to a first group among groups formed according to a preset criterion or dynamically configurable criterion. Here, a task may refer to an executable job with a separate program section (e.g., code, variable, stack or the like). A task may correspond to a user request. In an embedded system, a task may be a minimum entity for scheduling. Scheduling may involve assigning priorities to tasks to be processed. The first group may be a task group composed of one or more tasks.

At block 603, the processing unit controller 150 assigns the first group to a first processing unit 130 functionally connected to the electronic device 800, 804 or 900. The first processing unit 130 may be a unit or core capable of processing and controlling a task. The first processing unit 130 may be either a high-performance core or a low-performance core.

At block 605, when the first group is determined as matching preset criteria of a second processing unit 140 functionally connected to the electronic device 800, 804 or 900, the processing unit controller 150 migrates the first group to the second processing unit 140. Here, migration may indicate transfer from one operating system to another operating system. For example, the main agent for task execution (e.g., computation, control or the other) may be switched from the first processing unit 130 to the second processing unit 140.

The criteria of the second processing unit 140 may be related with the amount of data needed by a group of tasks, activation of an application in the group, and threshold throughput for the group.

Figure 7:
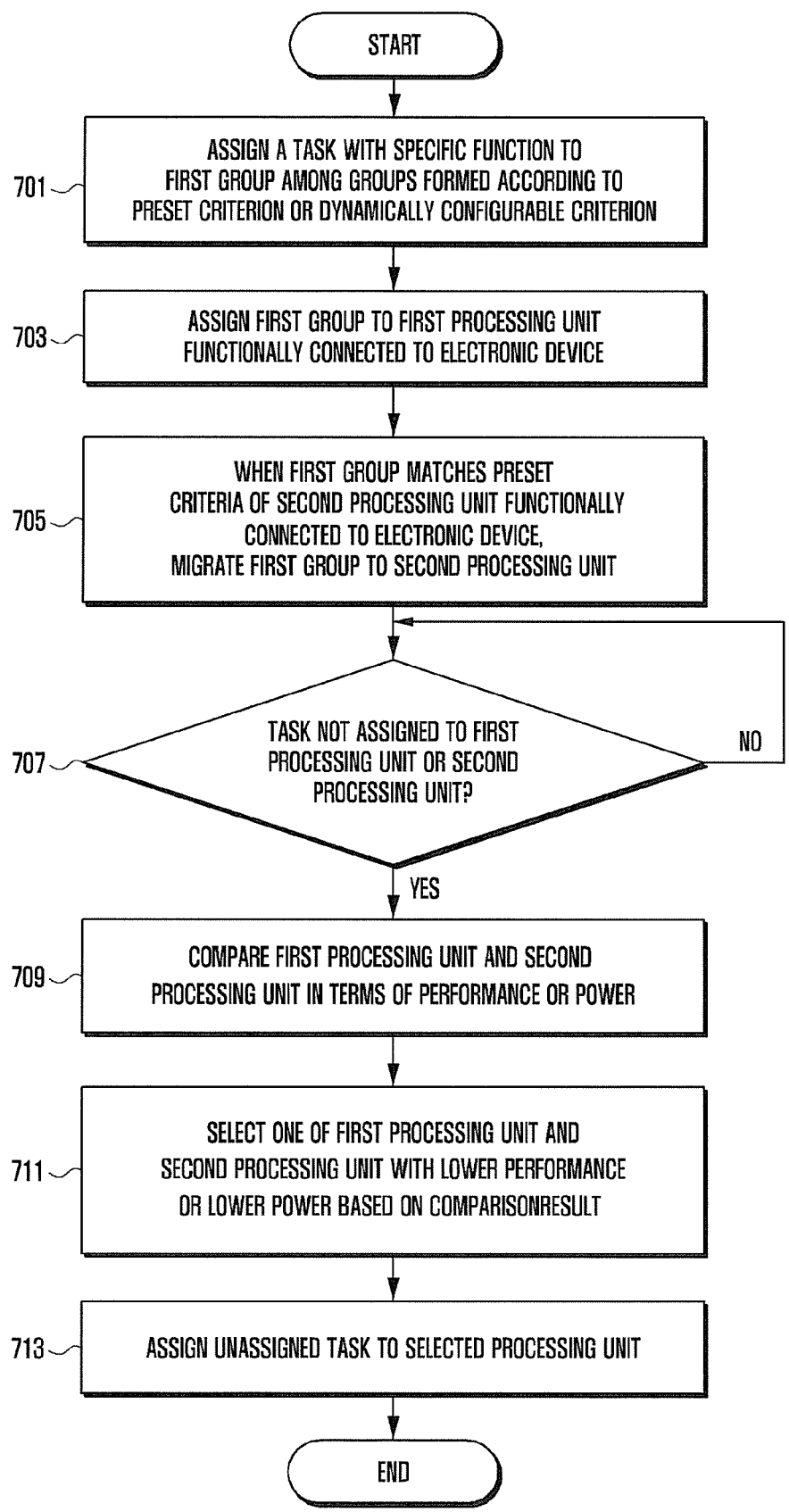
FIG. 7 illustrates a method for task group migration between processing units according to various embodiments of the present disclosure.

FIG. 7 illustrates a method for task group migration between processing units according to various embodiments of the present disclosure.

Referring to FIG. 7, at block 701, the group determiner 160 assigns a task with a specific function to a first group among groups formed according to a preset criterion or dynamically configurable criterion. Here, a task may refer to an executable job with a separate program section (e.g., code, variable, stack or the like). A task may correspond to a user request.

In an embedded system, a task may be a minimum entity for scheduling. Scheduling may involve assigning priorities to tasks to be processed. The first group may be a task group composed of one or more tasks.

At block 703, the processing unit controller 150 assigns the first group to a first processing unit 130 functionally connected to the electronic device 800, 804 or 900. The first processing unit 130 may be a unit or core capable of processing and controlling a task. The first processing unit 130 may be either a high-performance core or a tow-performance core.

At block 705, when the first group is determined as matching preset criteria of a second processing unit 140 functionally connected to the electronic device 800, 804 or 900, the processing unit controller 150 migrates the first group to the second processing unit 140. Here, migration may indicate transfer from one operating system to another operating system. For example, the main agent for task execution (e.g., computation, control or the other) may be switched from the first processing unit 130 to the second processing unit 140.

At block 707, the processing unit controller 150 checks presence of a task not assigned to a first processing unit 130 or a second processing unit 140. An unassigned task may be RT task or a normal task.

If a task not assigned yet is present, at block 709, the processing unit controller 150 compares the first processing unit 130 and the second processing unit 140 in terms of performance or power.

At block 711, on the basis of the result of comparison, the processing unit controller 150 selects one of the first processing unit 130 and the second processing unit 140 with lower performance or tower power.

At block 713, the processing unit controller 150 assigns the task not yet assigned to the selected processing unit. For example, a run queue for task execution may be attached to a processing unit such as a core. RT tasks with fixed priorities and normal tasks may be inserted in the run queue. An RT task with a fixed priority may be in an unassigned state or be assigned to a processing unit. Here, the processing unit controller 150 may assign or migrate an RT task with a fixed priority to a processing unit of low performance or low power.

In the above description, blocks 707 to 713 are processed after block 705. However, blocks 707 to 713 may be processed independently of blocks 701 to 705 or may be processed before block 701.

FIG. 8 illustrates a network environment 801 including therein an electronic device 800 in accordance with an embodiment of the present disclosure. Referring to FIG. 8, the electronic device 800 may include, but not limited to, a bus 810, a processor 820, a memory 830, an input/output interface 840, a display 850, a communication interface 860, and an application control module 870.

The bus 810 may be a circuit designed for connecting the above-discussed elements and communicating data (e.g., a control message) between such elements.

The processor 820 may receive commands from the other elements (e.g., the memory 830, the input/output interface 840, the display 850, the communication interface 860, or the application control module 870, etc.) through the bus 810, interpret the received commands, and perform the arithmetic or data processing based on the interpreted commands.

The memory 830 may store therein commands or data received from or created at the processor 820 or other elements (e.g., the input/output interface 840, the display 850, the communication interface 860, or the application control module 870, etc.). The memory 830 may include programming modules such as a kernel 831, a middleware 832, an application programming interface (API) 833, and an application 834. Each of the programming modules may be composed of software, firmware, hardware, and any combination thereof.

The kernel 831 may control or manage system resources (e.g., the bus 810, the processor 820, or the memory 830, etc.) used for performing operations or functions of the other programming modules, e.g., the middleware 832, the API 833, or the application 834. Additionally, the kernel 831 may provide an interface that allows the middleware 832, the API 833 or the application 834 to access, control or manage individual elements of the electronic device 800.

The middleware 832 may perform intermediation by which the API 833 or the application 834 communicates with the kernel 831 to transmit or receive data. Additionally, in connection with task requests received from the applications 834, the middleware 832 may perform a control (e.g., scheduling or load balancing) for the task request by using technique such as assigning the priority for using a system resource of the electronic device 800 (e.g., the bus 810, the processor 820, or the memory 830, etc.) to at least one of the applications 834.

The API 833 which is an interface for allowing the application 834 to control a function provided by the kernel 831 or the middleware 832 may include, for example, at least one interface or function (e.g., a command) for a file control, a window control, an image processing, a text control, and the like.

According to embodiments, the application 834 may include an SMS/MMS application, an email application, a calendar application, an alarm application, a health care application (e.g., an application for measuring quantity of motion or blood sugar), an environment information application (e.g., an application for offering information about atmospheric pressure, humidity, or temperature, etc.), and the like. Additionally or alternatively, the application 834 may be an application associated with an exchange of information between the electronic device 800 and any external electronic device (e.g., an external electronic device 804). This type application may include a notification relay application for delivering specific information to an external electronic device, or a device management application for managing an external electronic device.

For example, the notification relay application may include a function to deliver notification information created at any other application of the electronic device 800 (e.g., the SMS/MMS application, the email application, the health care application, or the environment information application, etc.) to an external electronic device (e.g., the electronic device 804). Additionally or alternatively, the notification relay application may receive notification information from an external electronic device (e.g., the electronic device 804) and offer it to a user. The device management application may manage (e.g., install, remove or update) a certain function (a turn-on/turn-off of an external electronic device (or some components thereof), or an adjustment of brightness (or resolution) of a display) of any external electronic device (e.g., the electronic device 804) communicating with the electronic device 800, a certain application operating at such an external electronic device, or a certain service (e.g., a call service or a message service) offered by such an external electronic device.

According to embodiments, the application 834 may include a specific application specified depending on attributes (e.g., a type) of an external electronic device (e.g., the electronic device 804). For example, in case an external electronic device is an MP3 player, the application 834 may include a specific application associated with a play of music. Similarly, in case an external electronic device is a portable medical device, the application 834 may include a specific application associated with a health care. In an embodiment, the application 834 may include at least one of an application assigned to the electronic device 800 or an application received from an external electronic device (e.g., the server 806 or the electronic device 804).

The input/output interface 840 may deliver commands or data, entered by a user through an input/output unit (e.g., a sensor, a keyboard, or a touch screen), to the processor 820, the memory 830, the communication interface 860, or the application control module 870 via the bus 810. For example, the input/output interface 840 may provide data about a user's touch, entered through the touch screen, to the processor 820. Also, through the input/output unit (e.g., a speaker or a display), the input/output interface 840 may output commands or data, received from the processor 820, the memory 830, the communication interface 860, or the application control module 870 via the bus 810. For example, the input/output interface 840 may output voice data, processed through the processor 820, to a user through a speaker.

The display 850 may display thereon various kinds of information (e.g., multimedia data, text data, etc.) to a user.

The communication interface 860 may perform communications between the electronic device 800 and any external electronic device e.g., the electronic device 804 or the server 806). For example, the communication interface 860 may communicate with any external device by being connected with a network 862 through a wired or wireless communication. A wireless communication may include, hut not limited to, at least one of WiFi (Wireless Fidelity), BT (Bluetooth), NFC (Near Field Communication), GPS (Global Positioning System), or a cellular communication (e.g., LTE, LTE-A, CDMA, WCDMA, UMTS, WiBro, or GSM, etc.). A wired communication may include, but not limited to, at least one of USB (Universal Serial Bus), HDMI (High Definition Multimedia Interface), RS-232 (Recommended Standard 232), or POTS (Plain Old Telephone Service).

According to an embodiment, the network 862 may be a communication network, which may include at least one of a computer network, an internet, an internet of things, or a telephone network. According to an embodiment, a protocol (e.g., transport layer protocol, data link layer protocol, or physical layer protocol) for a communication between the electronic device 800 and any external device may be supported by at least one of the application 834, the API 833, the middleware 832, the kernel 831, or the communication interface 860.

The application control module 870 may process at least part of information obtained from the other elements (e.g., the processor 820, the memory 830, the input/output interface 840, or the communication interface 860, etc.) and then offer it to a user in various ways. For example, the application control module 870 may recognize information about access components equipped in the electronic device 800, store such information in the memory 830, and execute the application 834 on the basis of such information.

FIG. 9 illustrates an electronic device 901 in accordance with embodiments of the present disclosure. The electronic device 901 may form, for example, the whole or part of the electronic device 800 shown in FIG. 8. Referring to FIG. 9, the electronic device 901 may include at least one application processor (AP) 910, a communication module 920, a subscriber identification module (SIM) card 924, a memory 930, a sensor module 940, an input unit 950, a display 960, an interface 970, an audio module 980, a camera module 991, a power management module 995, a battery 996, an indicator 997, and a motor 998.

The AP 910 may drive an operating system or applications, control a plurality of hardware or software components connected thereto, and also perform processing and operation for various data including multimedia data. The AP 910 may be formed of system-on-chip (SoC), for example. According to an embodiment, the AP 910 may further include a graphic processing unit (GPU) (not shown).

The communication module 920 (e.g., the communication interface 160) may perform a data communication with any other electronic device (e.g., the electronic device 104 or the server 106) connected to the electronic device 901 (e.g., the electronic device 800) through the network. According to an embodiment, the communication module 920 may include therein a cellular module 921, a WiFi module 923, a BT module 925, a GPS module 927, an NFC module 928, and an RF (Radio Frequency) module 929.

The cellular module 921 may offer a voice call, a video call, a message service, an internet service, or the like through a communication network (e.g., LTE, LTE-A, CDMA, WCDMA, UMTS, WiBro, or GSM, etc.). Additionally, the cellular module 921 may perform identification and authentication of the electronic device in the communication network, using the SIM card 924. According to an embodiment, the cellular module 921 may perform at least part of functions the AP 910 can provide. For example, the cellular module 921 may perform at least part of a multimedia control function.

According to an embodiment, the cellular module 921 may include a communication processor (CP). Additionally, the cellular module 921 may be formed of SoC, for example. Although some elements such as the cellular module 921 (e.g., the CP), the memory 930, or the power management module 995 are shown as separate elements being different from the AP 910 in FIG. 9, the AP 910 may be formed to have at least part (e.g., the cellular module 921) of the above elements in an embodiment.

According to an embodiment, the AP 910 or the cellular module 921 (e.g., the CP) may load commands or data, received from a nonvolatile memory connected thereto or from at least one of the other elements, into a volatile memory to process them. Additionally, the AP 910 or the cellular module 921 may store data, received from or created at one or more of the other elements, in the nonvolatile memory.

Each of the WiFi module 923, the BT module 925, the GPS module 927 and the NEC module 928 may include a processor for processing data transmitted or received therethrough. Although FIG. 9 shows the cellular module 221, the WiFi module 223, the BT module 225, the GPS module 927 and the NFC module 928 as different blocks, at least part of them may be contained in a single IC (Integrated Circuit) chip or a single IC package in an embodiment. For example, at least part (e.g., the CP corresponding to the cellular module 921 and a WiFi processor corresponding to the WiFi module 923) of respective processors corresponding to the cellular module 921, the WiFi module 923, the BT module 925, the GPS module 927 and the NFC module 928 may be formed as a single SoC.

The RF module 929 may transmit and receive data, e.g., RE signals or any other electric signals. Although not shown, the RE module 929 may include a transceiver, a PAM (Power Amp Module), a frequency filter, an LNA (Low Noise Amplifier), or the like. Also, the RF module 929 may include any component, e.g., a wire or a conductor, for transmission of electromagnetic waves in a free air space. Although FIG. 9 shows that the cellular module 921, the WiFi module 923, the BT module 925, the GPS module 927 and the NEC module 928 share the RF module 929, at least one of them may perform transmission and reception of RF signals through a separate RF module in an embodiment.

The SIM card 924 may be a specific card formed of SIM and may be inserted into a slot formed at a certain place of the electronic device. The SIM card 924 may contain therein an ICCID (Integrated Circuit Card IDentifier) or an IMSI (International Mobile Subscriber Identity).

The memory 930 (e.g., the memory 130) may include an internal memory 932 and an external memory 934. The internal memory 932 may include, for example, at least one of a volatile memory (e.g., DRAM (Dynamic RAM), SRAM (Static RAM), SDRAM (Synchronous DRAM), etc.) or a nonvolatile memory (e.g., OTPROM (One Time Programmable ROM), PROM (Programmable ROM), EPROM (Erasable and Programmable ROM), EEPROM (Electrically Erasable and Programmable ROM), mask ROM, flash ROM, NAND flash memory, NOR flash memory, etc.).

According to an embodiment, the internal memory 932 may have the form of an SSD (Solid State Drive). The external memory 934 may include a flash drive, e.g., CF (Compact Flash), SD (Secure Digital), Micro-SD (Micro Secure Digital), Mini-SD (Mini Secure Digital), xD (eXtreme Digital), memory stick, or the like. The external memory 934 may be functionally connected to the electronic device 901 through various interfaces. According to an embodiment, the electronic device 901 may further include a storage device or medium such as a hard drive.

The sensor module 940 may measure physical quantity or sense an operating status of the electronic device 901, and then convert measured or sensed information into electric signals. The sensor module 940 may include, for example, at least one of a gesture sensor 940A, a gyro sensor 940B, an atmospheric sensor 940C, a magnetic sensor 940D, an acceleration sensor 940E, a grip sensor 940F, a proximity sensor 940G, a color sensor 940H (e.g., RGB (Red, Green, Blue) sensor), a biometric sensor 940I, a temperature-humidity sensor 940J, an illumination sensor 940K, and a UV (ultraviolet) sensor 940M. Additionally or alternatively, the sensor module 940 may include, e.g., an E-nose sensor (not shown), an EMG (electromyography) sensor (not shown), an EEG (electroencephalogram) sensor (not shown), an ECG (electrocardiogram) sensor (not shown), an IR (infrared) sensor (not shown), an iris scan sensor (not shown), or a finger scan sensor (not shown). Also, the sensor module 940 may include a control circuit for controlling one or more sensors equipped therein.

The input unit 950 may include a touch panel 952, a digital pen sensor 954, a key 956, or an ultrasonic input unit 958. The touch panel 952 may recognize a touch input in a manner of capacitive type, resistive type, infrared type, or ultrasonic type. Also, the touch panel 952 may further include a control circuit. In case of a capacitive type, a physical contact or proximity may be recognized. The touch panel 952 may further include a tactile layer. In this case, the touch panel 952 may offer a tactile feedback to a user.

The digital pen sensor 954 may be formed in the same or similar manner as receiving a touch input or by using a separate recognition sheet. The key 956 may include, for example, a physical button, an optical key, or a keypad. The ultrasonic input unit 958 is a specific device capable of identifying data by sensing sound waves with a microphone 988 in the electronic device 901 through an input tool that generates ultrasonic signals, thus allowing wireless recognition. According to an embodiment, the electronic device 901 may receive a user input from any external device (e.g., a computer or a server) connected thereto through the communication module 920.

The display 960 (e.g., the display 150) may include a panel 962, a hologram 964, or a projector 966. The panel 962 may be, for example, LCD (Liquid Crystal Display), AM-OLED (Active Matrix Organic Light Emitting Diode), or the like. The panel 962 may have a flexible, transparent or wearable form. The panel 962 may be formed of a single module with the touch panel 952. The hologram 964 may show a stereoscopic image in the air using interference of light. The projector 966 may project an image onto a screen, which may be located at the inside or outside of the electronic device 901. According to an embodiment, the display 960 may further include a control circuit for controlling the panel 962, the hologram 964, and the projector 966.

The interface 970 may include, for example, an HDMI (High-Definition Multimedia Interface) 972, a USB (Universal Serial Bus) 974, an optical interface 976, or a D-sub (D-subminiature) 978. The interface 970 may be contained, for example, in the communication interface 160 shown in FIG. 1. Additionally or alternatively, the interface 970 may include, for example, an MHL (Mobile High-definition Link) interface, an SD (Secure Digital) card/MMC (MultiMedia Card) interface, or an IrDA (Infrared Data Association) interface.

The audio module 980 may perform a conversion between sounds and electric signals. At least part of the audio module 980 may be contained, for example, in the input/output interface 140 shown in FIG. 1. The audio module 980 may process sound information inputted or outputted through a speaker 982, a receiver 984, an earphone 986, or a microphone 988.

The camera module 991 is a device capable of obtaining still images and moving images. According to an embodiment, the camera module 991 may include at least one image sensor (e.g., a front sensor or a rear sensor), a lens (not shown), an ISP (Image Signal Processor, not shown), or a flash (e.g., LED or xenon lamp, not shown).

The power management module 995 may manage electric power of the electronic device 901. Although not shown, the power management module 995 may include, for example, a PAM (Power Management integrated Circuit), a charger IC, or a battery or fuel gauge.

The PMIC may be formed, for example, of an IC chip or SoC. Charging may be performed in a wired or wireless manner. The charger IC may charge a battery 996 and prevent overvoltage or overcurrent from a charger. According to an embodiment, the charger IC may have a charger used for at least one of wired and wireless charging types. A wireless charging type may include, for example, a magnetic resonance type, a magnetic induction type, or an electromagnetic type. Any additional circuit for a wireless charging may be further used such as a coil loop, a resonance circuit, or a rectifier.

The battery gauge may measure the residual amount of the battery 996 and a voltage, current or temperature in a charging process. The battery 996 may store or create electric power therein and supply electric power to the electronic device 901. The battery 996 may be, for example, a rechargeable battery or a solar battery.

The indicator 997 may show thereon a current status (e.g., a booting status, a message status, or a recharging status) of the electronic device 901 or of its part (e.g., the AP 910). The motor 998 may convert an electric signal into a mechanical vibration. Although not shown, the electronic device 901 may include a specific processor (e.g., GPU) for supporting a mobile TV. This processor may process media data that comply with standards of DMB (Digital Multimedia Broadcasting), DVB (Digital Video Broadcasting), or media flow.

Each of the above-discussed elements of the electronic device disclosed herein may be formed of one or more components, and its name may be varied according to the type of the electronic device. The electronic device disclosed herein may be formed of at least one of the above-discussed elements without some elements or with additional other elements. Some of the elements may be integrated into a single entity that still performs the same functions as those of such elements before integrated.

The term "module" used in embodiments of the present disclosure may refer to, for example, a "unit" including one of hardware, software, and firmware, or a combination of two or more thereof. The term "module" may be interchangeable with a term such as a unit, a logic, a logical block, a component, or a circuit. The "module" may be a minimum unit of an integrated component or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations.

According to various embodiments of the present disclosure, at least some of the devices (e.g., modules or functions thereof) or the method (e.g., operations) according to the present disclosure may be implemented by a command stored in a non-transitory computer-readable storage medium in a programming module form. When the command is executed by one or more processors (e.g., the processor 122), the one or more processors may execute a function corresponding to the command. The non-transitory computer-readable storage medium may be, for example, the memory 130. At least a part of the programming module may be implemented (e.g., executed) by, for example, the processor 210. At least a part of the programming module may include, for example, a module, a program, a routine, a set of instructions, and/or a process for performing one or more functions.

The non-transitory computer-readable recording medium may include magnetic media such as a hard disk, a floppy disk, and a magnetic tape, optical media such as a Compact Disc Read Only Memory (CD-ROM) and a Digital Versatile Disc (DVD), magneto-optical media such as a floptical disk, and hardware devices specially configured to store and perform a program instruction (for example, e.g., programming module), such as a Read Only Memory (ROM), a Random Access Memory (RAM), a flash memory and the like. In addition, the program instructions may include high class language codes, which can be executed in a computer by using an interpreter, as well as machine codes made by a compiler. The aforementioned hardware device may be configured to operate as one or more software modules in order to perform the operation of various embodiments of the present disclosure, and vice versa.

In particular, the present disclosure may provide a storage medium storing instructions executable by an electronic device, wherein the instructions are configured to assign a task with a specific function to a first group among task groups formed according to a preset criterion, assign the first group to a first processing unit functionally connected to the electronic device, and migrate, when the first group matches preset criteria of a second processing unit functionally connected to the electronic device, the first group to the second processing unit.

Although the present disclosure has been described with embodiments, various changes and modifications may be suggested to one skilled in the art. It is intended that the present disclosure encompass such changes and modifications as fall within the scope of the appended claims.

What is claimed is:

1. A method for task migration in an electronic device, the method comprising:
assigning, by a processing unit controller, a task with a specific function to a first group among groups formed according to a preset criterion, the preset criterion comprising one or more of: related with an amount of data needed by a group of tasks, activation of an application in the first group, threshold throughput for a first group user settings, manufacturer settings, an amount of throughput, or an amount of battery power consumed;

assigning, by the processing unit controller, the first group to one of first processing units functionally connected to the electronic device; and when the first group matches preset criteria of second processing units functionally connected to the electronic device, migrating, by the processing unit controller, the first group to one of the second processing units, the preset criteria of the second processing units comprising one or more of: related with the amount of data needed by a group of tasks, activation of an application in the group, or threshold throughput for the group.

2. The method of claim 1, wherein each of the first processing units and each of the second processing units is a minimum entity capable of executing instructions of the task.

3. The method of claim 1, wherein the first processing units and the second processing units constitute a single processor.

4. The method of claim 1, wherein the first processing units constitute a first processor among multiple processors, and wherein the second processing units constitute a second processor different from the first processor among the multiple processors.

5. The method of claim 1, wherein the first processing units are different from the second processing units in terms of at least one of: performance and power.

6. The method of claim 1, wherein the first group is one of:
a group of tasks related by an operating system of the electronic device,
a group of tasks related by foreground applications whose functions are active,
a group of tasks related by background applications whose functions are in a wait state, and
a group of tasks related by background applications whose user interfaces are not displayed.

7. The method of claim 6, wherein migrating the first group comprises migrating the first group to one of the second processing units when:
the first group is a group of tasks related with background applications, and
the first processing units are of at least one of high performance and high power and the second processing units are of at least one of low perfoimance and low power.

8. The method of claim 1, wherein migrating the first group comprises:
checking whether throughput of a task assigned to at least one of the first processing units is less than or equal to a threshold value; and
when throughput of the task assigned to a first processing unit is less than or equal to the threshold value, migrating the task to at least one of the second processing units.

9. The method of claim 1, further comprising:
checking presence of a task not assigned to at least one of the first processing units and not assigned to at least one of the second processing units;

when the task not assigned is present, comparing at least one of:
performance of at least one of the first processing units with the performance of at least one of the second processing units, and
power of the at least one of the first processing units with the power of the at least one of the second processing units;
determining, from one of the first processing unit and the second processing unit, a processing unit with at least one of: lower performance and lower power; and
assigning the unassigned task to the determined processing unit.

10. An electronic device comprising:
first processing units functionally connected to the electronic device;
second processing units functionally connected to the electronic device;
a group determiner assigning a task with a specific function to a first group among groups formed according to a preset criterion, the preset criterion comprising one or more of: related with an amount of data needed by a group of tasks, activation of an application in the first group, threshold throughput for a first group user settings, manufacturer settings, an amount of throughput, or an amount of battery power consumed; and
a processing unit controller controlling a process of:
assigning the first group to one of the first processing units, and
when the first group matches preset criteria of the second processing units, migrating the first group to one of the second processing units, the preset criteria of the second processing units comprising one or more of: related with the amount of data needed by a group of tasks, activation of an application in the group, or threshold throughput for the group.

11. The electronic device of claim 10, wherein each of the first processing units and each of the second processing units is a minimum entity capable of executing instructions of the task.

12. The electronic device of claim 10, wherein the first processing units and the second processing units constitute a single processor.

13. The electronic device of claim 10, wherein the first processing units constitute a first processor among multiple processors, and wherein the second processing units constitute a second processor different from the first processor among the multiple processors.

14. The electronic device of claim 10, wherein the first processing units are different from the second processing units in terms of at least one of: performance and power.

15. The electronic device of claim 10, wherein the first group is one of:
a group of tasks related by an operating system of the electronic device,
a group of tasks related by foreground applications whose functions are active,
a group of tasks related by background applications whose functions are in a wait state,
a group of tasks related by background applications whose user interfaces are not displayed.

16. The electronic device of claim 15, wherein the processing unit controller is controlling an operation to migrate the first group to one of the second processing units when:
the first group is a group of tasks related by background applications, and the first processing units are of at least one of high performance and high power and the second processing units are of at least one of low performance and low power.

17. The electronic device of claim 10, wherein the processing unit controller:
checks whether throughput of a task assigned to at least one of the first processing units is less than or equal to a threshold value, and
when throughput of the task assigned to the at least one of the first processing units is less than or equal to the threshold value, migrates the task to at least one of the second processing units.

18. The electronic device of claim 10, wherein the processing unit controller:
checks presence of a task not assigned to at least one of the first processing units and not assigned to at least one of the second processing units;
when the task not assigned is present, compare at least one of:
performance of at least one of the first processing units with the performance of at least one of the second processing units, and
power of the at least one of the first processing units with the power of the at least one of the second processing units;
determines, from one of the first processing units and the second processing units, a processing unit with at least one of: lower performance or lower power; and
assigns the unassigned task to the determined processing unit.

19. A non-transitory storage medium storing instructions executable by an electronic device, wherein, when executed by processing circuitry of the electronic device, the instructions cause the processing circuitry to:
assign a task with a specific function to a first group among task groups formed according to a preset criterion, the preset criterion comprising one or more of: related with an amount of data needed by a group of tasks, activation of an application in the first group, threshold throughput for a first group user settings, manufacturer settings, an amount of throughput, or an amount of battery power consumed,
assign the first group to one of first processing units functionally connected to the electronic device, and
when the first group matches preset criteria of second processing units functionally connected to the electronic device, migrate the first group to one of the second processing units, the preset criteria of the second processing units comprising one or more of: related with the amount of data needed by a group of tasks, activation of an application in the group, or threshold throughput for the group.

20. The non-transitory storage medium of claim 19, wherein the instructions, when executed by processing circuitry of the electronic device, cause the processing circuitry to migrate the first group to one of the second processing units when:
the first group is a group of tasks related with background applications, and
the first processing units are of at least one of high performance and high power and the second processing units are of at least one of low performance and low power.

* * * * *